United States Patent
Itakura et al.

(10) Patent No.: US 6,195,645 B1
(45) Date of Patent: Feb. 27, 2001

(54) DATA COMMUNICATION SYSTEM

(75) Inventors: Katsuyuki Itakura, Tokyo; Kazuyoshi Toma, Tokorozawa, both of (JP)

(73) Assignee: Casio Computer Co., Ltd., Tokyo (JP)

( * ) Notice: Subject to any disclaimer, the term of this patent is extended or adjusted under 35 U.S.C. 154(b) by 0 days.

(21) Appl. No.: 08/817,383

(22) PCT Filed: Aug. 21, 1996

(86) PCT No.: PCT/JP96/02332

§ 371 Date: Apr. 17, 1997

§ 102(e) Date: Apr. 17, 1997

(87) PCT Pub. No.: WO97/09700

PCT Pub. Date: Mar. 13, 1997

(30) Foreign Application Priority Data

Aug. 25, 1995 (JP) .................................. 7-239047

(51) Int. Cl.[7] .................................... H04Q 3/00
(52) U.S. Cl. ............................... 705/21; 705/16
(58) Field of Search .................. 705/20, 21, 22, 705/16; 395/200.31, 200.38, 200.39; 390/825.02, 825.05, 825.06, 825.08, 825.15; 712/31, 28; 710/20, 21; 709/200, 201, 206, 208, 211, 292, 294

(56) References Cited

U.S. PATENT DOCUMENTS

| | | | |
|---|---|---|---|
| 4,398,250 | * | 8/1983 | Hosono .................................. 705/21 |
| 4,502,120 | * | 2/1985 | Ohnishi et al. ....................... 705/21 |
| 4,594,664 | * | 6/1986 | Hashimoto .............................. 705/21 |
| 4,841,442 | * | 6/1989 | Hosoyama .............................. 705/20 |
| 5,189,607 | * | 2/1993 | Shirasaki et al. ....................... 705/21 |
| 5,251,214 | * | 10/1993 | Mertens et al. ......................... 370/92 |
| 5,256,863 | | 10/1993 | Ferguson et al. . |
| 5,920,267 | * | 7/1999 | Tattersall et al. ............... 340/825.05 |

FOREIGN PATENT DOCUMENTS

| | | | |
|---|---|---|---|
| 331 442 | * | 9/1989 | (EP) . |
| 0 395 428 | | 10/1990 | (EP) . |
| 0 405 594 | | 1/1991 | (EP) . |
| 0 553 988 A2 | | 8/1993 | (EP) . |
| 2 206 225 | | 12/1988 | (GB) . |

OTHER PUBLICATIONS

Giambra, "Performance Considerations for Token Ring Networks" Southern Tier Technical Conference pp. 268–275, 1988.*

* cited by examiner

*Primary Examiner*—M. Kemper
(74) *Attorney, Agent, or Firm*—Frishauf, Holtz, Goodman, Langer & Chick, P.C.

(57) ABSTRACT

In a system having a plurality of apparatuses connected via a communication line, one apparatus serving as a master unit performs processing on data stored in the other apparatus or apparatuses. The apparatus serving as a master unit generates a work designation message containing a program statement and transmits it to the other apparatuses. The apparatus, receiving the message, performs data processing based on the message and transfers the message to another apparatus in a predetermined order. All the apparatuses connected to the communication line perform processing based on a received message and the processing is completed when the message is returned back to the master unit.

8 Claims, 12 Drawing Sheets

WORK DESIGNATION MESSAGE
TRANSMISSION FORMAT

| ECR1 RESULT | XX1  ¥300 |
|---|---|
|  | XX2  ¥500 |
|  | ⋮ |
| ECR2 RESULT | YY1  ¥1500 |
|  | YY2  ¥200 |
|  | ⋮ |
| ECR3 RESULT | PROCESS UNAVAILABILITY HISTORY |

FIG.9

DATA COMMUNICATION SYSTEM

TECHNICAL FIELD

The present invention relates to a data communication system having a plurality of terminals connected to a communication line.

BACKGROUND ART

Conventionally, in a master/slave type POS (point-of-sale) system, the master unit sequentially designates the respective slave units (e.g. electric cash registers (ECRs) as POS terminals) according to a polling system to enable the collection or consolidation of sales data or the transferring of set data, or an inquiry with respect to inventory. That is, the master unit designates, one by one, the associated ECRs in a predetermined sequence to perform processing such as the collection, consolidation, etc., of data.

In this way, the master unit manages all the slave units and effects operations such as the collection and consolidation of data, thus placing a burden on the master unit. Where the master unit, in particular, serves as an ECR, there is the problem that the master unit per se cannot perform a registration of sales data until it has finished effecting processing on the last slave unit.

DISCLOSURE OF THE INVENTION

The object of the present invention is to provide a communication system having a plurality of terminals connected via communication line in a manner such that the burden on a master unit in the processing of the data is decreased.

According to the present invention, there is provided a data communication method which is for use in a data communication system having a plurality of data processing apparatuses connected via a communication line, wherein one of the data processing apparatuses causes another processing apparatus to execute data processing,-the method comprising the following steps of:

a) enabling one of the data processing apparatuses serving as a master unit to generate a-work designation message containing a program statement for performing predetermined data processing and to transmit the work designation message to another apparatus;

b) enabling the apparatus which receives the work designation message to perform data processing in accordance with the program statement contained in the work designation message;

c) enabling the apparatus which receives the work designation message to transmit the work designation message to a next apparatus in a predetermined order; and d) completing the data processing when the master unit receives, from the next apparatus, the work designation message generated therefrom.

According to the present invention, moreover, there is provided a data communication system having a plurality of data processing apparatuses connected via a communication line, each of the data processing apparatuses comprising:

transmitting/receiving means for receiving data from the communication line and for transmitting data to the communication line;

memory means for storing a work designation message which is received by the-transmitting/receiving means from another data processing apparatus;

processing means for performing predetermined processing on the basis of the work designation message stored in the memory means; and transferring means for transmitting the work designation message which is stored in the memory means to a next data processing apparatus in accordance with a predetermined order.

BRIEF DESCRIPTION OF THE DRAWINGS

FIG. 9 is a view illustrating collection result data in the work designation message;

BEST MODE OF CARRYING OUT THE INVENTION (First Embodiment)

Figure 1:
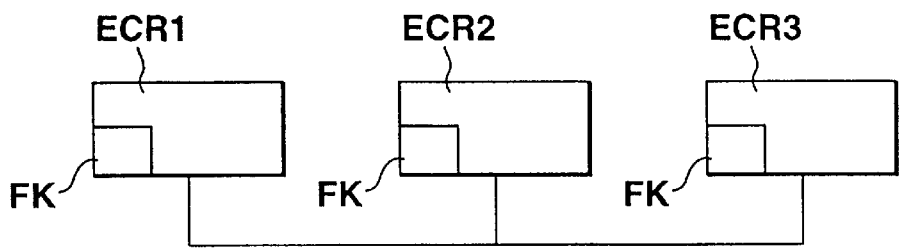
FIG. 1 is a system arrangement of a POS system to which the present invention is applied.

FIG. 1 is a system arrangement of a POS system. In this POS system, three ECRs serving as POS terminals are connected to a local dedicated line. Each respective ECR itself performs registration processing on sales data and can serve as a master unit against the other ECRs. The role of the ECR as the master unit is to designate the collection of sales data or the consolidation of the sales data relative to the other ECRs or the transferring set data.

By the term "collection of the sales data" is here meant that the ECR serving as the master unit gains access to data on individual items of goods stored into a registering file of the ECR. The term "consolidation of the sales data" is intended to mean that the master-ECR gains access to the consolidated data of the sales of the respective ECRs. The term "transferring of set data" is intended to mean that the master-ECR transfers data to the other ECRs-so as to add new data to the goods/price table (Price Look-Up Table) in ECR and rewrite data.

For the ECR serving as the master unit it is necessary to operate a work designation key FK on the respective ECRs and designate the kinds of processing. Where, for example, ECR1 designates the collection of sales data to the other ECRs, the operator designates "collection" on a keyboard on the ECR1 and operates a work designation key FK. Then a work designation message is created for "collection" and the message is transferred to the other ECRs; ECR2 and ECR3 in this order to perform sales data collection processing. The detail of this processing will be set out below.

Figure 2:
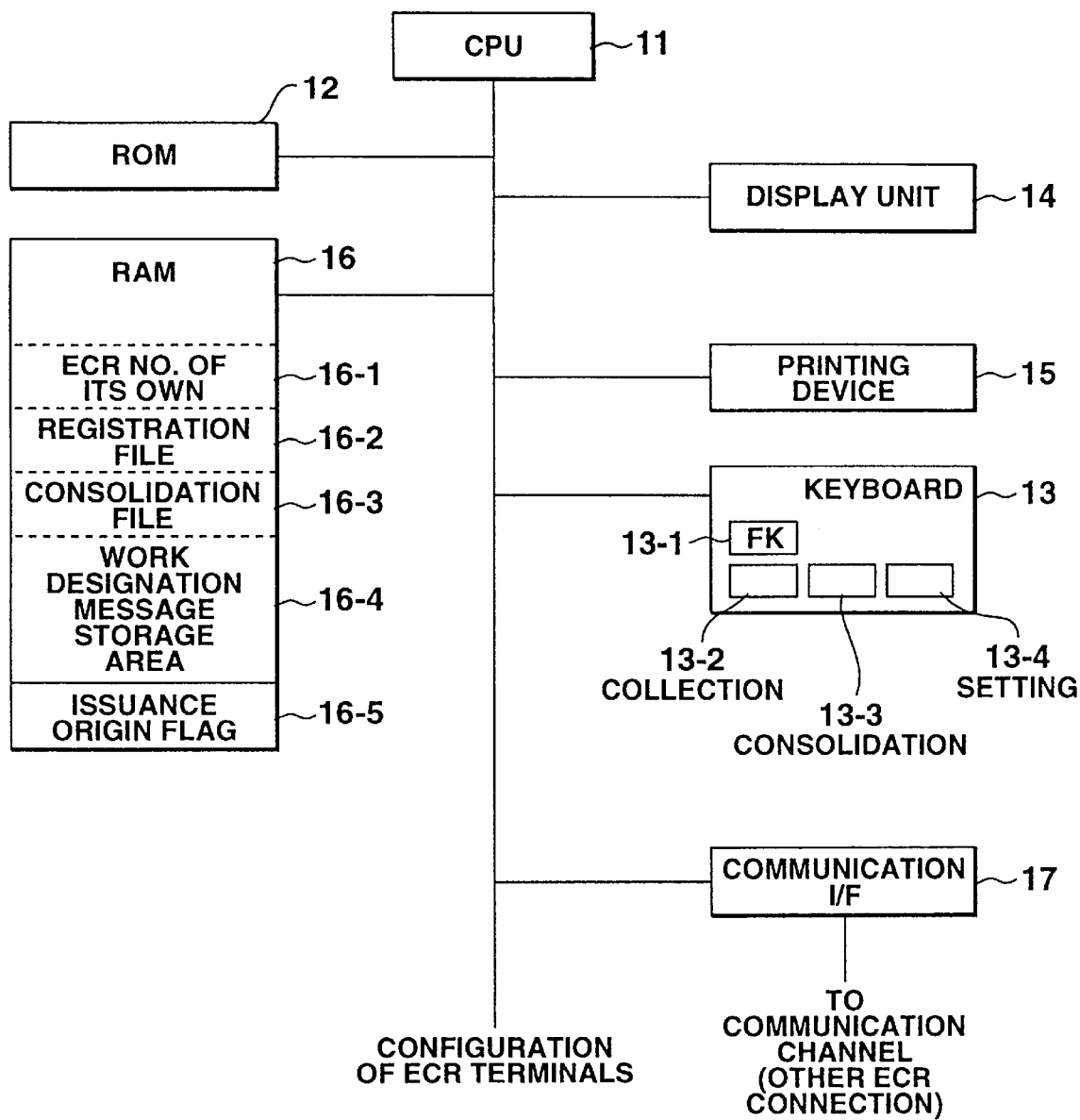
FIG. 2 is a block diagram of each ECR constituting a POS system.

FIG. 2 is a schematic block diagram of the respective ECR.

A CPU 11 controls the whole of this ECR in accordance with various kinds of programs stored in a ROM 12 and allows the sales data which is input from a keyboard 13 to be displayed on a display unit 14, to be printed by a printing device 15 on a receipt/journal and to be stored in a file in a RAM 16.

Areas are provided, in the RAM 16, for storing predetermined data and various kinds of files. A memory area 16-1 stores ECR No. A registering file 16-2 stores individual sales data and includes files on the goods items by kind, person in charge, and so on. A file 16-3 stores results of consolidations of the sales data. The RAM 16 further has an area 16-4 for storing a work designation message and an area 16-5 for storing a flag indicating that the work designation message has been issued.

The keyboard 13 includes, in addition to various types of keys for registering sales data on the ECR, a work designation key FK 13-1 for serving as a master unit, a "collection" key 13-2, a "consolidation" key 13-3 and a "setting" key 13-4 for designating processing.

When the work designation key 13-1 is operated and, for example, "collection" key 13-2 is operated, the work designation message for designating data collection to the other ECRs is read out from the ROM 12 and stored in the work designation message memory area 16-4. This message is transmitted from a communication interface area 17 to the associated ECRs. Upon receipt of the message from the ECR serving as the master unit, the designated ECRs allow the message to be stored in the work designation message memory area 16-4 of their own RMs 16.

Figure 3:
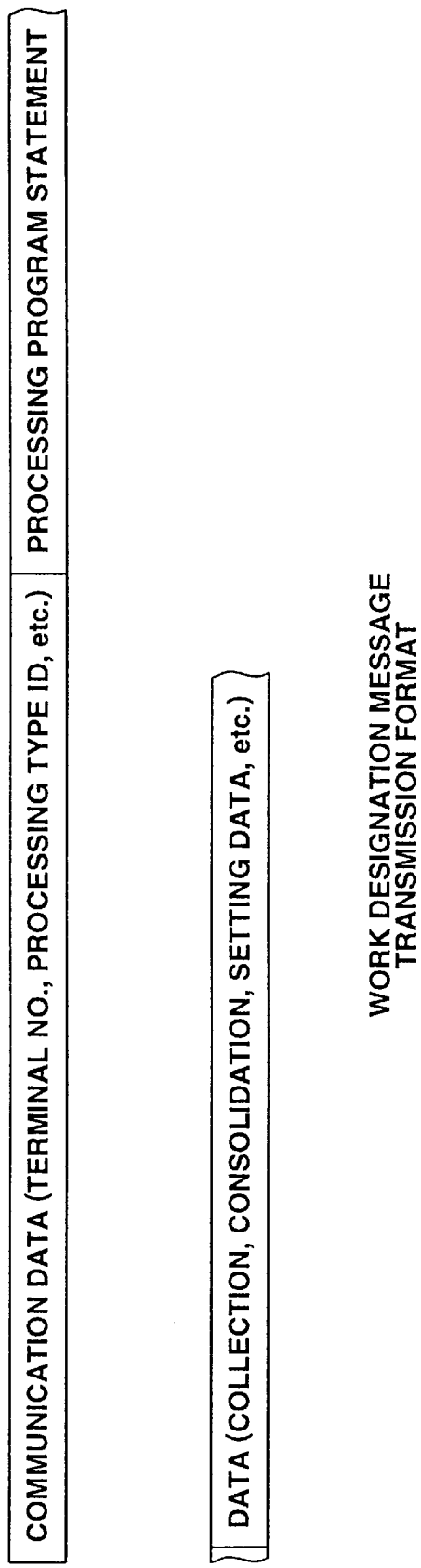
FIG. 3 is a view showing a transmission format of a work designation message.

The work designation message is comprised of three parts, as shown in FIG. 3, that is, communication data, processing program statement and processing data.

The communication data contains ECR No. of a transmission origin and ID representing the kinds of processing. The processing program statement has its predetermined programs set by "collection", "consolidation" and "setting" processing. The processing data contains results of collection and consolidation processing by the associated ECRs, when the message is for "collection" and "consolidation", and data set in the Price Look-Up Tables when the message is for "setting".

Then the operation of the POS system will be explained below in accordance with a flow chart as shown in FIGS. 4 to 7.

Figure 4:
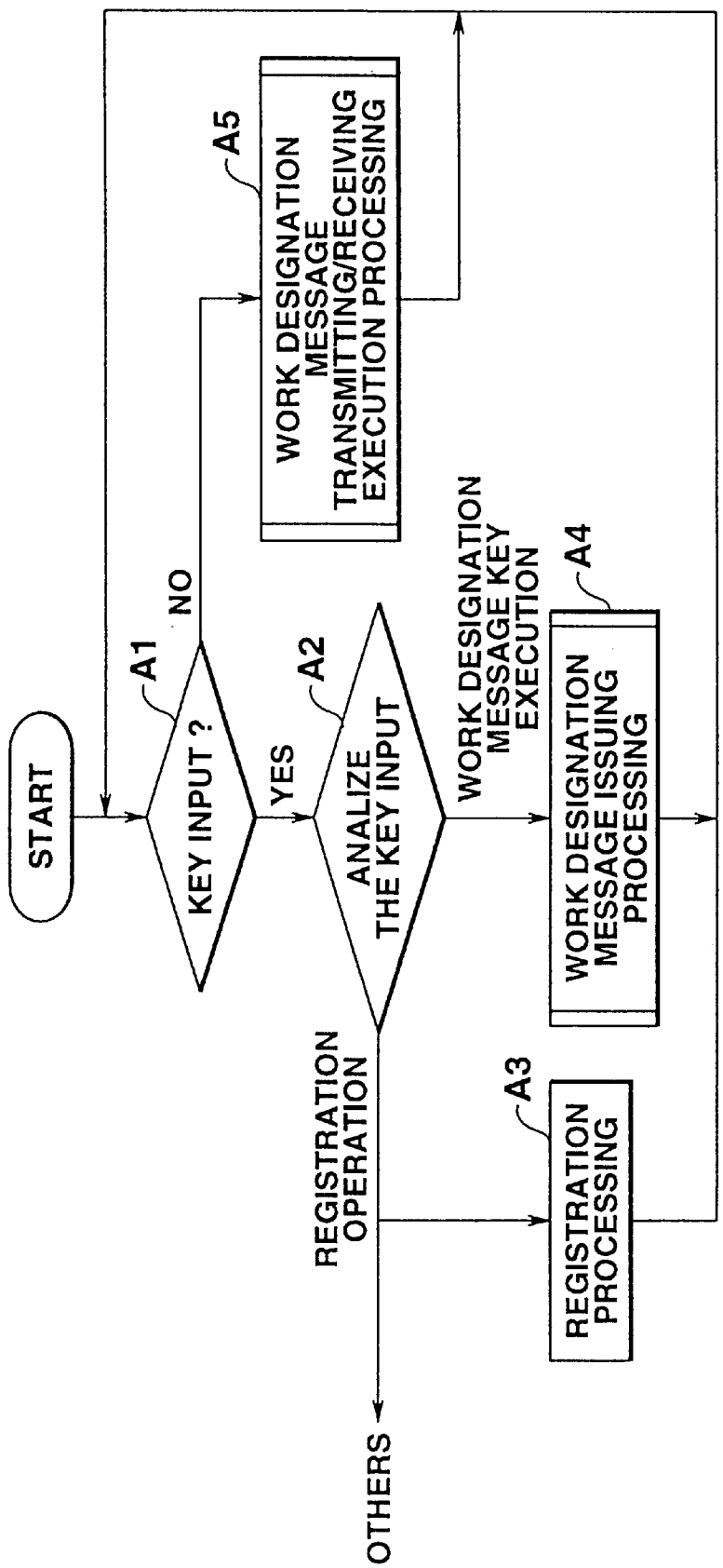
FIG. 4 is a flow chart showing an outline of a whole operation in each ECR.

FIG. 4 is the flow chart briefly showing the operation of the respective ECRs.

In a key input waiting state (step A1), if any key is input, then the CPU 11 analyzes the input (step A2). If it is an ordinary registration operation by the ECR, registration processing is made for registering input sales data in the registration file 16-2 (step A3). If, on the other hand, the work designation message execution key FK is operated, control goes to step A4 and work designation message issuing processing is carried out as will be set out below. Or in the key input waiting state, if there occurs no keyed-in operation, control goes to step A5 and work designation message transmitting/receiving execution processing is carried out as will be set out below.

Figure 5:
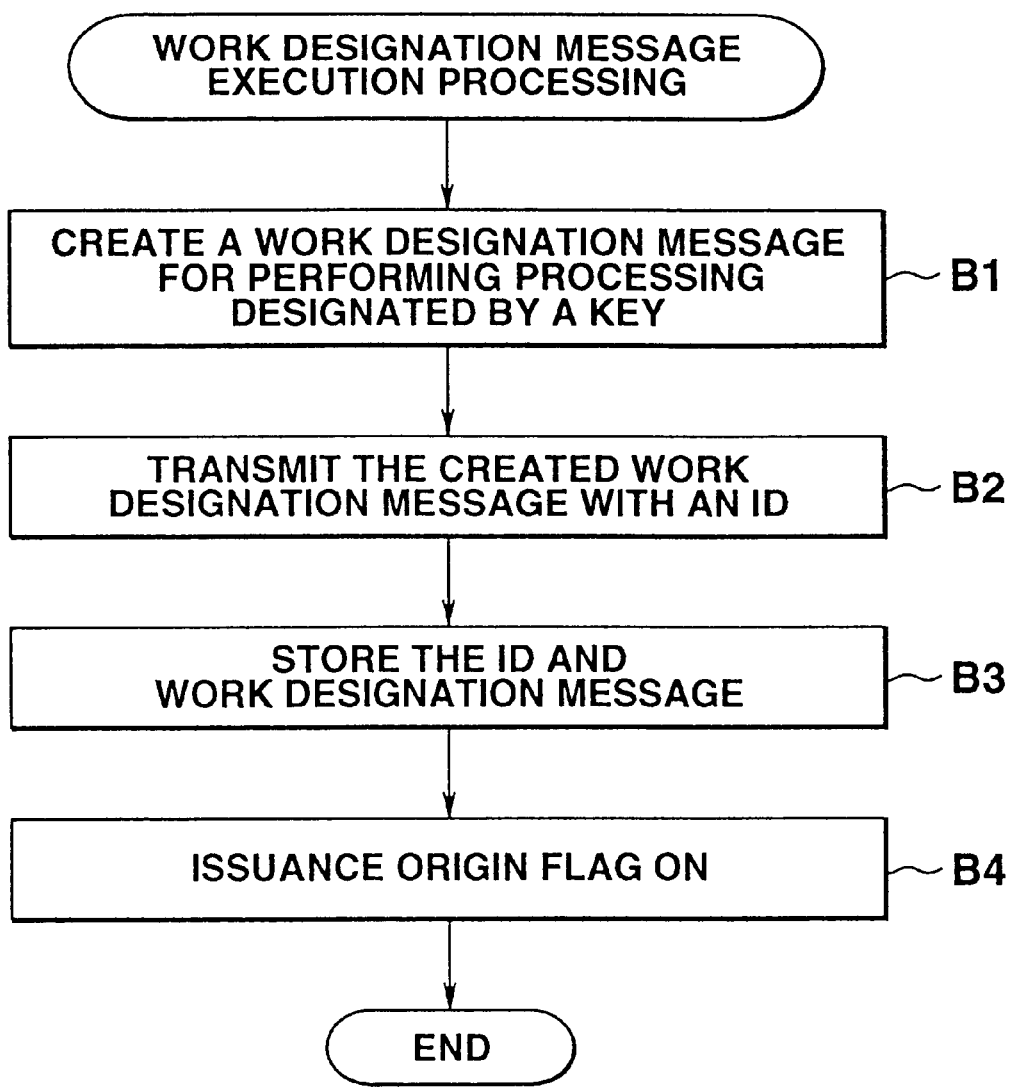
FIG. 5 is a flow chart showing a step A4 (work designation message issuance processing) in FIG. 4.

FIG. 5 shows a flow chart showing the work designation message issuance processing (step A4 in FIG. 4). Based on the-contents of the processing designated at a time of operating the work designation message execution key FK, the CPU 11 enables the creation of a work designation message for performing processing on the associated respective ECRs (step B1).

If the ECR1 acts as a master unit and collects data on, for example, "liquors" from the sales data of the whole POS system, the conditions of the "liquors" are contained in the "collection" processing program statement. The processing data contains collection data on this kind of goods in the ECR1.

The created work designation message with an ID inherent in its processing is sent to the next ECR (step B2). In this case, the next ECR means an ECR designated in a predetermined order, that is, an ECR having No. following to that of the ECR now in question. This ID and work designation message are stored in the work designation message storage area 16-4 (step B3) and the issuance origin flag 16-5 is also set (step B4).

Figure 6:
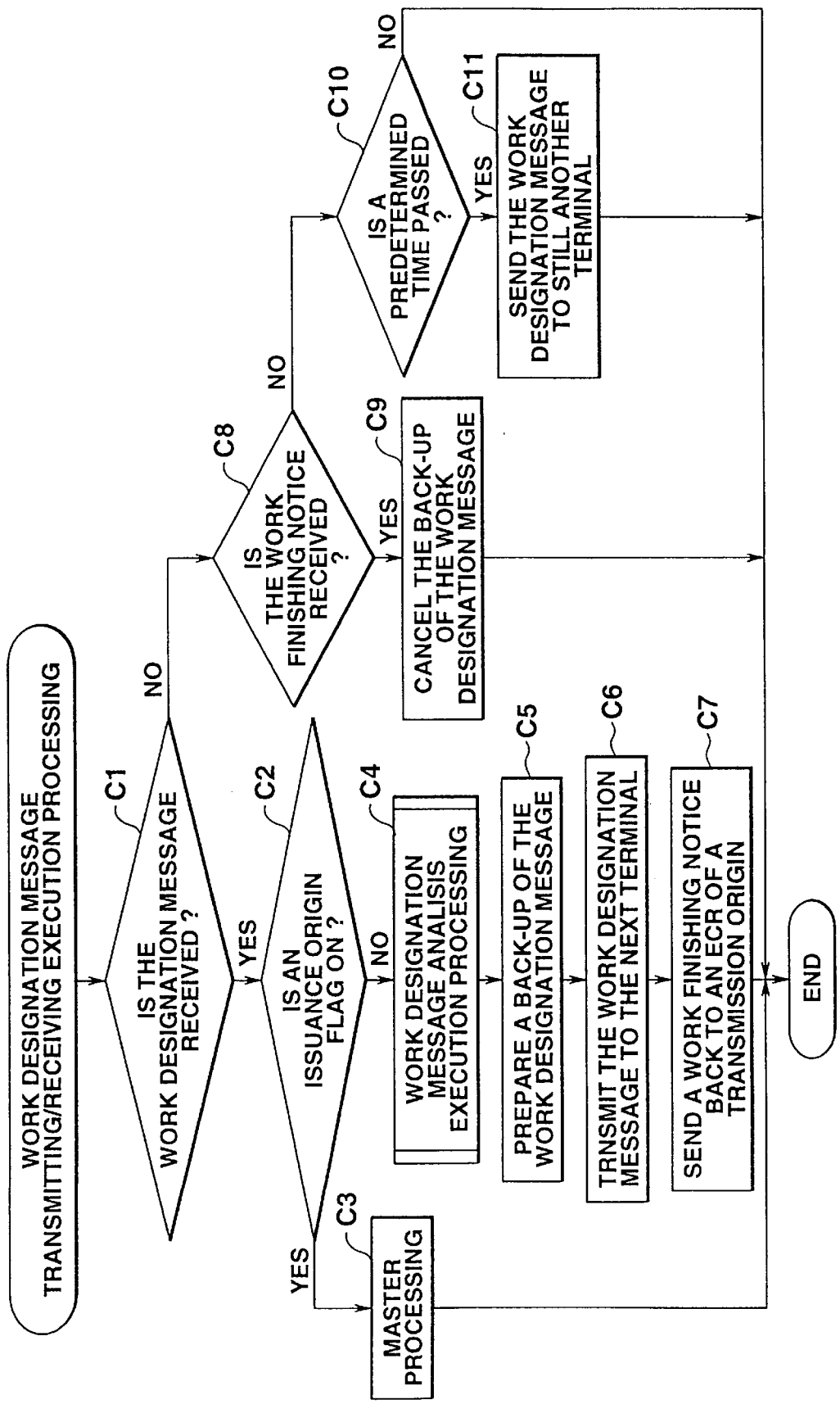
FIG. 6 is a flow chart showing a step A5 (work designation message transmitting/receiving prosecution processing) in FIG. 4.

FIG. 6 shows a flow chart showing the work designation message transmitting/receiving processing (step A5 in FIG. 4).

The respective ECRs checks, at all times, whether the work designation message is received or not during operation (step C1). If it is received, checking is made to see whether the issuance origin flag is ON or not (step C2). If the work designation message issued from the ECR1 is received by the ECR2, since the ECR2 constitutes no work designation message issuance origin in this case, control goes to step C4 and the work designation message analysis execution processing is carried out.

Figure 7:
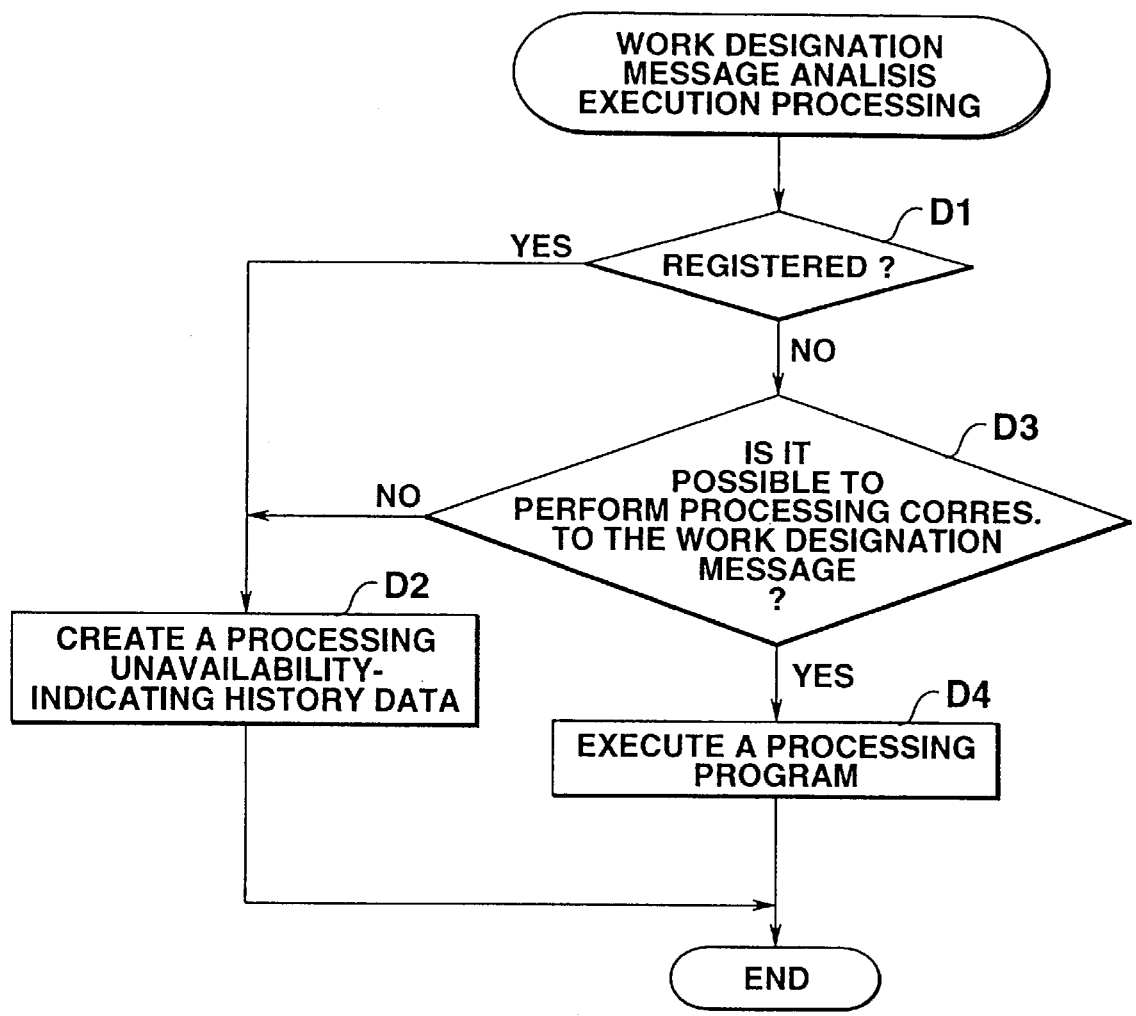
FIG. 7 is a flow chart showing a step C4 (work designation message analysis prosecution processing) in a step C4 in FIG. 6.

FIG. 7 is a flow chart showing the work designation message analysis execution processing.

It is determined whether or not the registration processing of the sales data as the function of the ECR is now performed (step D1). If YES, no processing corresponding to the work designation message is exacted so as to give priority to the registration processing and history data (in this case, the registration in-progress indicating data) showing an inability to effect further processing is prepared as shown in step D2 and this route goes out of the process. Further, even if not in progress of registration, when it is not possible to perform processing corresponding to the work designation message (step D3), no data processing corresponding to the work designation message is carried out. If, for example, a department of a processing target is designated as "liquors" in the "collection" work designation message, when there is no corresponding designation department, no data processing corresponding to the work designation message is carried out. In these cases, processing-unavailability history data indicating these facts is prepared as shown in step D2.

If not in progress of registration, when it is possible to effect processing corresponding to the work designation message, the processing program is executed in step D4.

When this work designation message analysis execution processing is completed, control goes to step C5 shown in FIG. 6, back-up data of the work designation message is prepared and it is stored in the ECR at its own work designation message storage area 16-4. In this case, at a time of data collection/consolidation processing, the ECR also stores results of its own processing contained in the work designation message as the back-up data in the work designation message storage area 16-4. The content of this work designation message storage area 16-4 is sent to the next ECR, that is, if this is the ECR2, to the next ECR3 as shown in step C6. A work completion notice is sent to the ECR1 as the transmission origin as shown in step C7. The processing in such steps C5 to C7 is carried out even in the case where the processing corresponding to the work designation message has not been executed as in progress of registration.

The ECR1 receives the work completion notice from the ECR2 and, when it detects its reception (step C8), the contents of the work designation message storage area 16-4 is cleared (step C9) so as to cancel the back-up of the work designation message. Backing up the work designation message is effected, for temporary storage and holding, until the work completion notice is received from its transmission origin. Where no work completion notice is received a predetermined time from the transmission of the work designation message (step C10), the following ECR is designated and the work designation message is transmitted in step C11.

In this way, the work designation message is sequentially transferred to the associated respective ECRs and, finally, the corresponding transmission origin. In this case, the ECR3 executes the collection processing in accordance with the received message and completes it and, when the ECR1 receives the work completion notice, the ON of the issuance origin flag is detected in step C2 and control goes to step C3 and a master processing is performed. That is, the ECR1 designates data collection to the associated respective ECR's, consolidates the collected data from these ECRs and prints a result on a journal report.

Figure 8:
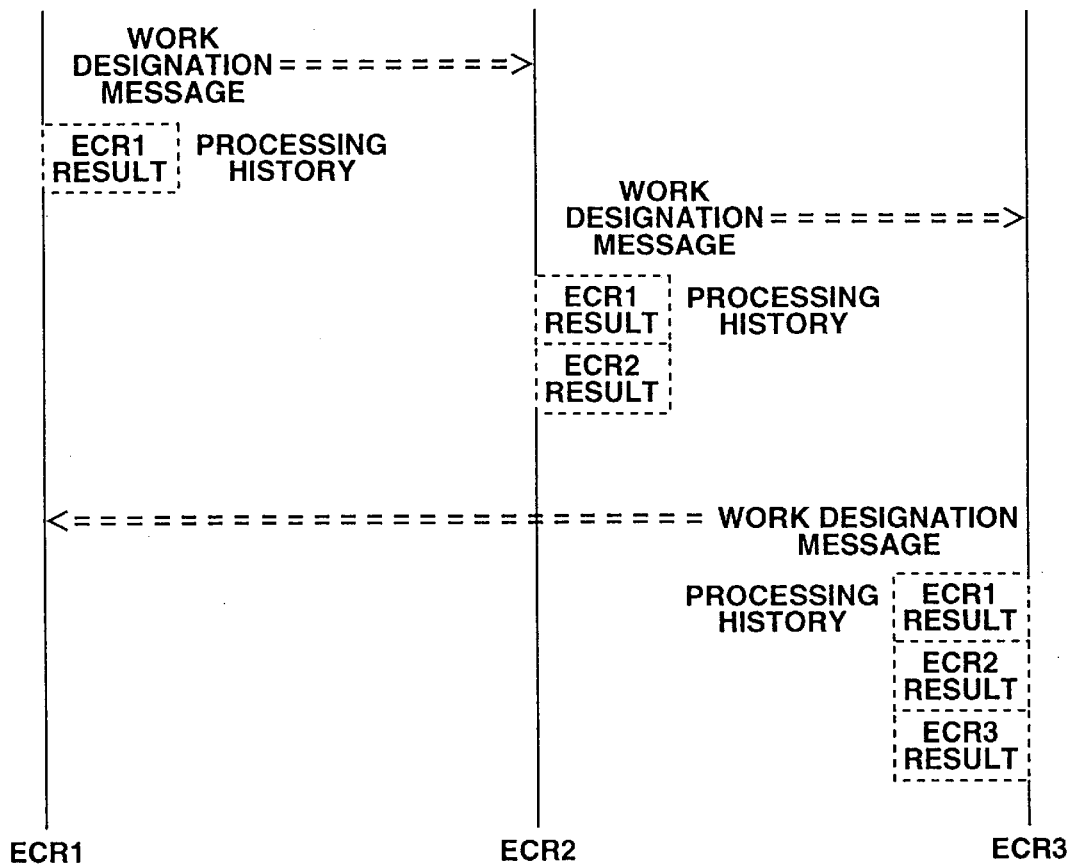
FIG. 8 is a view for explaining an outline of an operation at a time of collecting data.

FIG. 8 shows the processing concept of a whole system at a time of data collection. Upon issuance of the work designation message, the ECR1 transmits the work designation message including the result of collection as a processing history to the ECR2. The ECR2 transmits the work designation message including the result of processing by the ECR1 as well as a result of collection by itself to the ECR3. The ECR3 transmits the work designation message including the results of processing by the ECR1 and ECR2 as well as a result of collection by itself to-the ECR1. In this case, FIG. 9 shows an example of collection by department and, in an ECR3 in FIG. 9, processing is not possible due to some reason, such as "in progress of registration". In this case, a history indicating the "unavailability of given processing" is sent, as a result of processing, to an ECR1.

Where, in the POS system thus constructed, the data collection/consolidation operation, for instance, is to be executed on the respective ECRs, it is only necessary for an ECR acting as a master unit to transmit a work designation message to the next ECR. It is, therefore, possible to largely lessen the burden on the master ECR. It is also possible for the master ECR to perform a registration operation even if other ECRs perform the data collection/consolidation, etc. . . . Further, in the case of the data consolidation, the data is consolidated on the respective ECR, thus enabling further lessening of the master ECR's burden.

Further, the processing program statement is contained in the work designation message and, even if any ECR not having such a function is included in the system, it is possible to execute that function in accordance with such a program statement. Even if any new function is required, it is possible that, without changing the contents of the ROM in the ECR, such a new function can be implemented by the work designation message sent from the other ECRs.

In the ECR receiving the work designation message, even where any processing corresponding to the work designation message cannot be performed due to some reason such as in progress of registration, since history data representing the unavailability of such processing is contained in the work designation message, it is possible for the master ECR to, when the work designation message is returned back to the master ECR, recognize the reason of such unavailability through the analysis of the work designation message.

Since, upon transmission of the work designation message to the next ECR, a corresponding backup is prepared, it is possible to make a repeat request even in the case where the work designation message is disappeared on its transmission path. In the case where a power failure, etc., occurs in the transmission destination, the message can also be transmitted to still another ECR, thus ensuring the positive transmission of the work designation message.

(Second Embodiment)

In the above-mentioned system, if more terminals (ECRs) are concerned to the network, more time is required for a master unit to receive a returned-back message after all the processing for requiring more amount of operation as in the collection of data has been ended. In the case where first the "collection" is designated and then it is desired to immediately know a result of "consolidation" while stopping the "collection" designation, it is necessary to interrupt an earlier designation.

Figure 10:
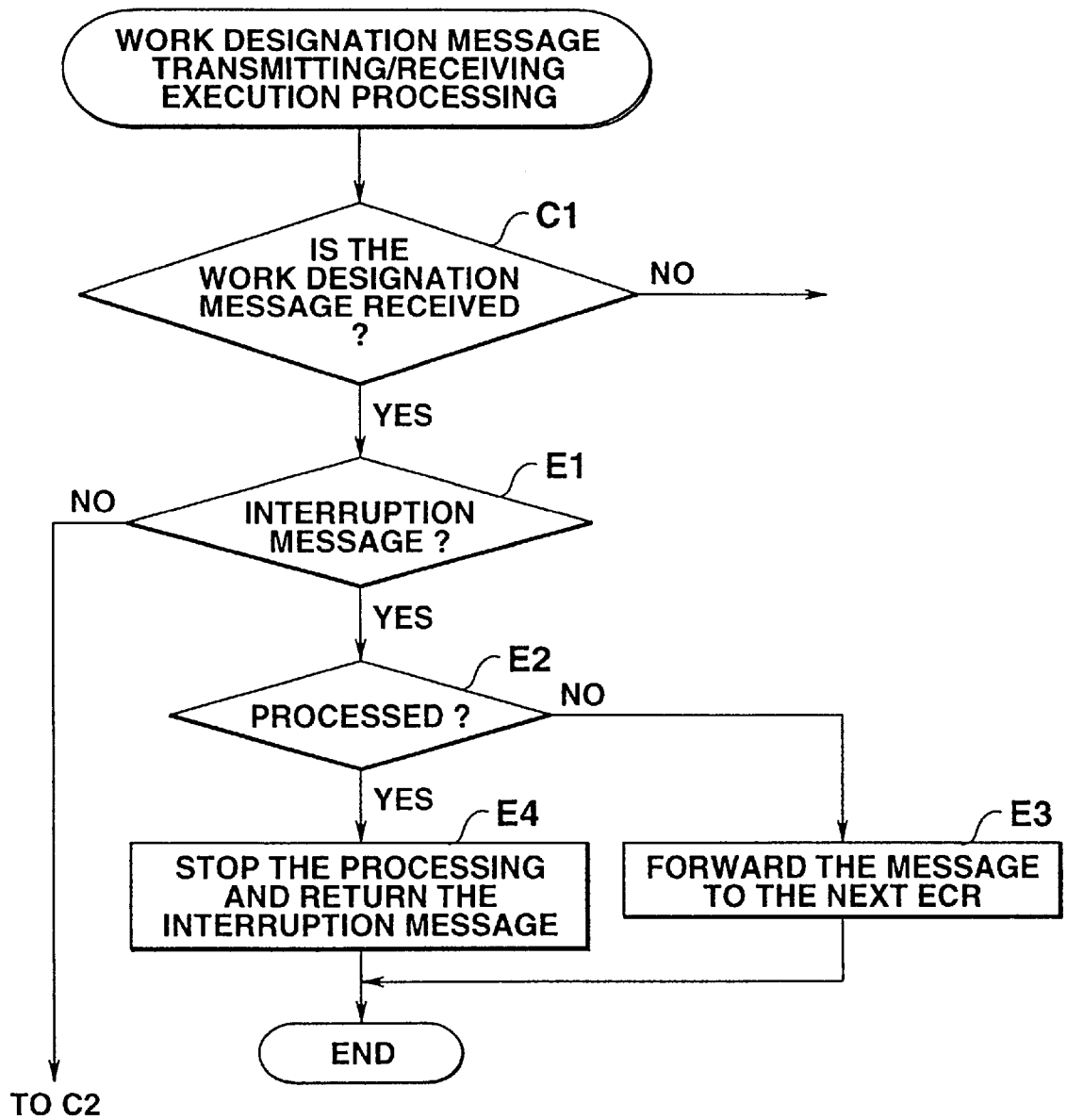
FIG. 10 is a flow chart of a second embodiment.

In order to solve this problem, an additional key for designating an interruption of an operation is added to the ECR and, by the depression of this key, a work designation message is prepared for the "interruption" mode. In this case it is only necessary to add a flowchart of FIG. 10 to the flowchart performed by the ECR as shown in FIG. 6.

Figure 11:
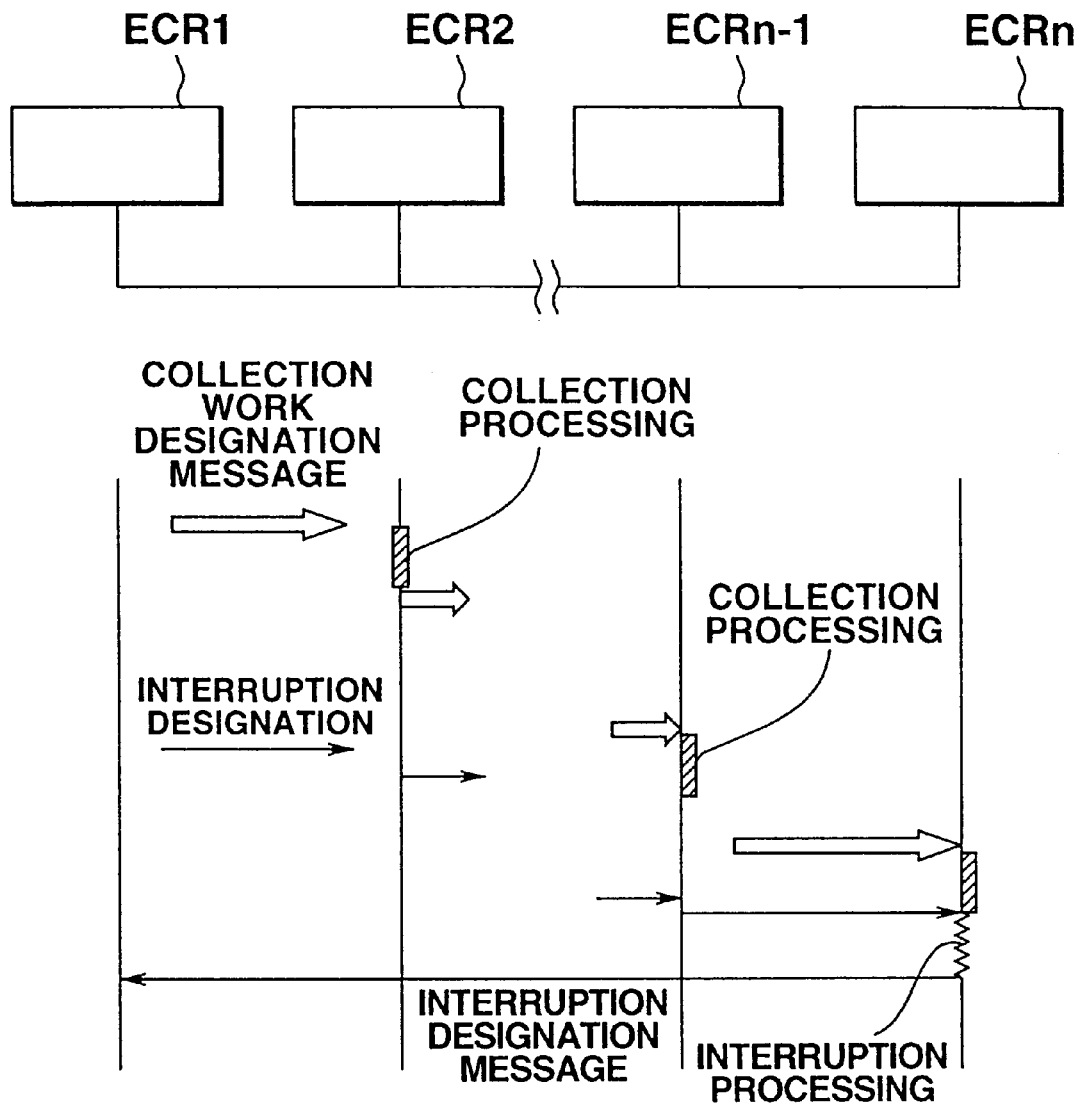
FIG. 11 is a view for explaining the second embodiment according to the present invention.

With reference to FIG. 11 explanation will be given about an ECR1 serving as a master unit, designating a "collection" and then designating an "interruption".

In FIG. 11, at a time point in which the ECR1 sends an "interruption", collection processing is shifted from an (N-1) th ECR to an N-th ECR. An ECR2 determines whether or not it receives an "interruption" message from the ECR1 (step C1, FIG. 10). Then it determines whether or not this message is the interruption message (step E1). If YES, the ECR2 determines whether or not processing is currently performed based on an earlier work designation message in step E2. In this case, the ECR2 has already completed the processing and transfers the interruption message to an ECR3 (step E3).

Similarly, the message is sequentially transferred from the ECR3 to an ECR(N-1) but the processing time required to transferring the message is brief. Therefore, while an ECR (N) is executing the collection of data, the interruption message is reached from the ECR(N-1) to the ECR(N). When the ECR(N) stops the processing now in progress, it sends the interruption designation message back to the ECR1 of an issuance origin (step E4). Thus, the ECR1 detects the interruption made.

(Third Embodiment)

A third embodiment according to the present invention will be explained below with reference to FIG. 12.

Figure 12:
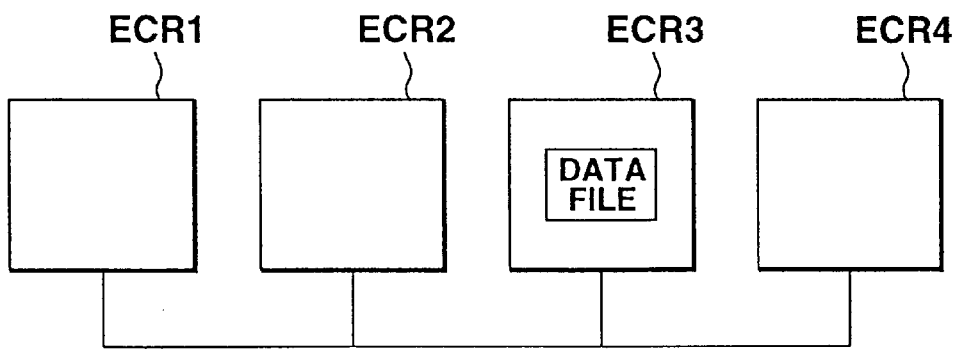
FIG. 12 is a view for explaining a third embodiment according to the present invention.
Figure 12:
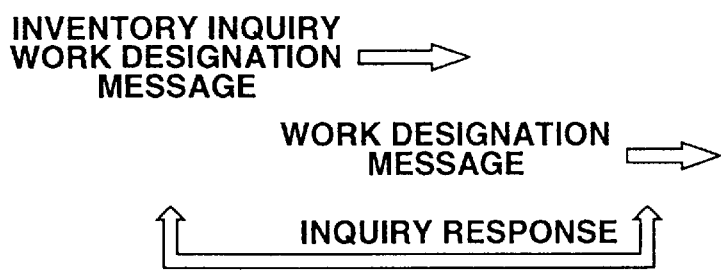

FIG. 12 shows an outline of the issuance by an ECR1 of a work designation message on an inventory inquiry.

Now, in order to give an inquiry to the other ECRs as to the contents of a given data file, the ECR1 issues a work designation message containing its processing and inquiry data. Then this work designation message is sent back to the ECR2. Here, the ECR2 determines whether or not it manages, under its own control, data required for an inquiry corresponding to the work designation message. If the answer is negative, the work designation message is sent to the next ECR3. Then the ECR3 determines whether or not it manages, under its own control, data necessary for an inquiry in the same way as set out above. Now, if the data necessary for an inquiry exists in the data file, the ECR3 directly makes an inquiry response to the ECR1 of an issuance origin without sending the work designation message to the next ECR4. Where an input is designated as goods inquiry data, for example, not only the number (No.) of the goods but also the color, length, width, etc., of the goods, if the ECR3 contains the corresponding data in its data file, the ECR3 makes an inquiry response to the ECR1.

In this way, where a given ECR makes an inquiry against another ECR, it is only necessary for an original inquiring ECR to issue the work designation message and, in this case, send it to the next ECR only so that the burden of the original inquiring ECR can be largely alleviated. Since the work designation message contains the corresponding processing program, it is also possible to make an inquiry response to the original inquiring ECR even if the inquired ECR is not equipped with a function necessary for the inquiry response.

Although in the respective embodiment the POS system has been explained as comprising a plurality of ECRs, the master ECR may be comprised of a personal computer. Further, the present invention is not restricted to the POS system and may be applied to other data communication systems.

Industrial Applicability

According to the present invention, there is provided a communication system having a plurality of terminals concerned via communication line in which a burden on a master unit in the processing of the data is decreased.

What is claimed is:

1. A data communication method for use in a data communication system having a plurality of data processing apparatuses connected via a communication line, wherein one of the data processing apparatuses causes one or more other processing apparatus to execute data processing, the method comprising:

enabling one of the data processing apparatuses serving as a master unit to generate a work designation message containing a program statement for performing predetermined data processing, and to transmit the work designation message to another apparatus according to a predetermined order;

enabling the apparatus which receives the work designation message to perform data processing on data stored in that apparatus in accordance with the program statement contained in the work designation message;

enabling the apparatus which receives the work designation message to return a completion notice to the apparatus from which the work designation message was transmitted when the data processing is completed;

enabling the apparatus which receives the work designation message to add a result of the data processing performed by that apparatus to the work designation message;

enabling the apparatus which receives the work designation message to transmit the work designation message, including the result of the data processing performed and added by that apparatus, to a next apparatus according to the predetermined order;

enabling the apparatus which has transmitted the work designation message to re-transmit the work designation to still another apparatus according to the predetermined order when the completion notice is not received in a predetermined time period from a previous apparatus to which the work designation message had been transmitted; and enabling the master unit to perform data processing based on all results of the data processing included in the work designation message when the master unit receives the work designation message from a last apparatus according to the predetermined order.

2. The data communication method according to claim 1, further comprising:

enabling the apparatus which receives the work designation message to store the work designation message therein; and eliminating the stored message when the completion notice is received from the next apparatus as a transmission destination.

3. The data communication method according to claim 1, wherein the method is applied to a POS system using ECRs as data processing apparatuses, and wherein the data processing performed based on the work designation message comprises at least one of data collection and data consolidation of sales data registered by the ECRs.

4. The data communication method according to claim 1, wherein the method is applied to a POS system using ECRs as data processing apparatuses, and wherein the data processing performed based on the work designation message comprises data setting in a price look-up table provided in each ECR.

5. The data communication method according to claim 1, further comprising:

enabling the master unit to generate and transmit a stop message for stopping the earlier transmitted work designation message;

enabling an apparatus which receives the stop message to determine whether or not the data processing corresponding to the work message is being performed; and transmitting the received stop message to the next apparatus when it is determined that the data processing is not being performed, or stopping the data processing and transmitting the stop message back to the master unit when it is determined that the data processing is being performed.

6. A data processing apparatus connected to a communication line, the apparatus comprising:

transmitter/receiver means for receiving data from other data processing apparatuses via the communication line, and for transmitting data to the other data processing apparatuses via the communication line;

mode setting means for setting the apparatus to a master mode in which the apparatus serves as a master unit;

master function executing means for, when the master mode is set, generating a work designation message containing a program statement for causing another apparatus to perform predetermined data processing, transmitting the work designation message to the other apparatus, and performing master processing based on the work designation message after the work designation message is returned; and slave function executing means for, when the master mode is not set, performing the predetermined data processing based on the program statement included in the work designation message stored in memory means, adding a result of the data processing to the work designation message stored in said memory means, and causing said transmitter/receiver means to transmit the work designation message to which the result of the data processing has been added to a next apparatus according to a predetermined order;

wherein upon completion of the predetermined processing, the slave function executing means causes the transmitter/receiver means to transmit a completion notice to the data processing apparatus from which the work designation message was transmitted; and wherein the slave function executing means causes the transmitter/receiver means to re-transmit the work designation message to still another data processing apparatus according to the predetermined order when the completion notice is not received in a predetermined time period from a previous data processing apparatus to which the work designation message had been transmitted.

7. The data processing apparatus according to claim 6, further comprising:
   memory means for, when the master mode is not set, storing the work designation message received by the transmitter/receiver means; and
   wherein upon receipt of the completion notice from a data processing apparatus of a transmission destination of the work designation message, the memory means cancels the work designation message stored therein.

8. The data processing apparatus according to claim 6, wherein the data processing apparatus comprises an ECR apparatus operable in a POS system, and wherein the predetermined processing performed based on the work designation message comprises at least one of data consolidation, data collection and data setting.

* * * * *